United States Patent [19]

Tamagawa et al.

[11] Patent Number: 5,657,382
[45] Date of Patent: Aug. 12, 1997

[54] TELECOMMUNICATION SYSTEM HAVING CAPABILITY OF NOTIFYING THE OCCURRENCE OF FORWARDING OF AN INCOMING CALL TO A TERMINAL

[75] Inventors: Noriko Tamagawa; Mika Takeuchi, both of Kawasaki, Japan

[73] Assignee: Fujitsu Limited, Kanagawa, Japan

[21] Appl. No.: 962,462

[22] Filed: Oct. 16, 1992

[30] Foreign Application Priority Data

Oct. 16, 1991 [JP] Japan .................. 3-266594

[51] Int. Cl.$^6$ .................. H04M 3/54; H04M 3/42
[52] U.S. Cl. .................. 379/211; 379/210; 379/201; 379/142; 379/133; 379/134
[58] Field of Search .................. 379/133, 134, 379/135, 136, 140, 141, 142, 210, 211, 212, 201, 209, 126, 127, 96, 112, 249, 214, 113

[56] References Cited

U.S. PATENT DOCUMENTS

| | | | |
|---|---|---|---|
| 4,313,035 | 1/1982 | Jordan et al. | 379/211 X |
| 4,413,158 | 11/1983 | Danford | 379/211 |
| 4,476,349 | 10/1984 | Cottrell et al. | 379/212 |
| 4,560,837 | 12/1985 | Carson et al. | 379/212 |
| 4,634,809 | 1/1987 | Paulsson et al. | 379/91 |
| 4,644,351 | 2/1987 | Zadbarsky et al. | 379/57 |
| 4,646,346 | 2/1987 | Emerson et al. | 379/214 |
| 4,670,900 | 6/1987 | Waldman | 379/211 |
| 4,757,267 | 7/1988 | Riskin | 379/201 X |
| 4,788,718 | 11/1988 | McNabb et al. | 379/134 |
| 4,853,952 | 8/1989 | Jachmann et al. | 379/88 |
| 4,893,335 | 1/1990 | Fuller et al. | 379/212 |
| 4,924,496 | 5/1990 | Figa et al. | 379/142 |
| 4,969,186 | 11/1990 | Sayre, II | 379/201 X |
| 5,023,868 | 6/1991 | Davidson et al. | 370/62 |
| 5,033,077 | 7/1991 | Bergeron et al. | 379/67 |
| 5,077,789 | 12/1991 | Clark, Jr. et al. | 379/211 |
| 5,177,780 | 1/1993 | Kasper et al. | 379/59 |
| 5,185,786 | 2/1993 | Zwick | 379/142 X |
| 5,241,586 | 8/1993 | Wilson et al. | 379/113 X |
| 5,245,651 | 9/1993 | Takashima et al. | 379/96 |
| 5,282,243 | 1/1994 | Dabbashi et al. | 379/211 |
| 5,311,576 | 5/1994 | Brunson et al. | 379/89 |
| 5,327,493 | 7/1994 | Richmond et al. | 379/372 |

FOREIGN PATENT DOCUMENTS 5327910  12/1993  Japan .................. 379/212

OTHER PUBLICATIONS

Bell Atlantic. "Select Forward" SSI #700217583 Feb. 1990.
"ALLTEL's Message Monitor", Ed Leibowitz, Teleconnect Sep. 1991, pp. 154–155.

*Primary Examiner*—Krista M. Zele
*Assistant Examiner*—Daniel S. Hunter
*Attorney, Agent, or Firm*—Helfgott & Karas, P.C.

[57] ABSTRACT

A telecommunication system comprises a network for carrying a traffic of information, terminals connected to the network, a transfer unit provided in the network for transferring a call coming in from a calling terminal to a first destination terminal and from the first destination terminal to a second destination terminal. An accumulation unit is provided in the network for accumulating information indicative of occurrence of a transfer of an incoming call each time the transfer of the call occurs from the first destination terminal to another destination terminal. The network further includes a transfer notification unit for notifying the first destination terminal of the occurrence of the transfer by transmitting a control signal from the network to the first destination terminal. A transfer reporting unit is provided in the network for receiving a request signal from the first terminal and for transmitting the call transfer information from the accumulation unit to the first destination terminal.

14 Claims, 10 Drawing Sheets

TELECOMMUNICATION SYSTEM HAVING CAPABILITY OF NOTIFYING THE OCCURRENCE OF FORWARDING OF AN INCOMING CALL TO A TERMINAL

BACKGROUND OF THE INVENTION

The present invention generally relates to telecommunication systems and in particular to a telecommunication system or network that has the capability of transferring a call directed to a terminal to another terminal.

The term "call transfer" used throughout the specification should be understood as call forwarding in a call forwarding system which automatically reroutes a call to be routed to the called station, to an alternate station.

The capability of transferring incoming call from a first destination terminal to a second destination terminal based upon registration in the network is used extensively. According to such a transfer capability, one can receive the call even when working at a location different from the usual working place, without human intervention for transferring the call. On the other hand, there can be an inconvenience in such a system in that the user cannot know whether there occurred a transfer of call in the terminal unless he or she answers the call at the working place to which the call is transferred. When the user is absent and has failed to answer the transferred call, there remains no record, in any of the first terminal to which the call has come in at first and the second terminal to which the call has been transferred from the first terminal, of the fact that there has been an incoming call and the same has been transferred. Thereby, the user cannot know the fact that the transfer of the call has occurred, even when he or she has returned to the usual work place.

FIG. 1 shows the construction of a conventional telecommunication system that has the capability of transferring a call.

Referring to FIG. 1, the telecommunication system includes a switching station 1 having the capability of transferring a call. There, the switching station 1 is connected to other switching stations 2 and 3, and the switching stations 1–3 form a telecommunication network 10. In the illustrated example, a terminal 7 having a dial number $DN_{17}$ is connected to the switching station 2, while a terminal 8 having a dial number $DN_1$ is connected to the switching station 3. Further, a terminal 6 having a dial number $DN_{16}$ is connected to the switching station 1.

The switching station 1 includes a central control unit 12 and a main memory 13 that cooperates with the unit 12, wherein the main memory 13 includes therein a memory field 131 for storing subscriber data SD for each of the terminals connected to the switching station 1. The subscriber data SD includes the information about whether the subscriber at the terminal such as the terminal 6 ($DN=DN_{16}$) is entitled to use the call-transfer service of the network or not as indicated by a flag T as well as the information about whether the user activates the call-transfer service or not as indicated by a flag t. For example, the flag T is set to the logic value "1" when the subscriber of the terminal contracts with the vendor of the network about the use of the call-transfer service. Similarly, the flag t is set to "1" when the subscriber or user of the terminal activates the call-transfer service.

In addition, the main memory 13 includes a memory field 132 for storing the dial number of destination terminals to which the call is to be transferred. For example, the memory field 132 may store the dial number $DN_{17}$ together with a corresponding abbreviated number.

In operation, the user at the terminal connected to the switching station 1 such as the terminal 6 sets the flag t in the memory field 131 to the logic value "1" via the control unit 12. At the same time, the user sets the dial number of the terminal to which the call is to be transferred such as the terminal 7 ($DN=DN_{17}$) in the memory field 131 of the main memory 13 in the abbreviated form. Thus, when a call directed to the terminal 6 comes in, for example from a terminal 8 via the switching station 3, the central control unit 12 of the switching station 1 checks for the flags set in the parameters T and t of the terminal 6 and reads out the dial number $DN_{17}$ from the memory field 132. Further, the call is transferred from the switching station 1 to the terminal 7 via the switching station 2 based upon the dial number $DN_{17}$ thus retrieved.

Obviously, the system of FIG. 1 lacks the capability of informing the transfer of the call to the terminal 6. In other words, the terminal 6 is not activated at all in the foregoing transfer operation, and the user that normally uses the terminal cannot know the fact that a transfer of an incoming call has occurred while he or she has been absent at the location where the terminal 7 is provided. Further, there can occur a problem that all the incoming calls are transferred, in vain, to the terminal 7 when the user at the terminal 6 has inadvertently activated the call transfer service and conducting activity at the site of the terminal 6.

SUMMARY OF THE INVENTION

Accordingly, it is a general object of the present invention to provide a novel and useful telecommunication system wherein the problems mentioned heretofore are eliminated.

Another and more specific object of the present invention is to provide a telecommunication system having a capability of transferring an incoming call from a first terminal to a second terminal, wherein the first terminal is notified of the fact that a transfer of incoming call has occurred.

Another object of the present invention is to provide a telecommunication system, comprising: a network for carrying a traffic of information; a plurality of terminals connected to said network for communicating with each other via said network in the form of said traffic of information, said network thereby providing a connection between a calling terminal and a destination terminal both included in said plurality of terminals; transfer means provided in said network for transferring a call coming in from a calling terminal that is included in said plurality of terminals with a destination set to a first destination terminal, from said first destination terminal to a second, different destination terminal, said first and second destination terminals being included in said plurality of terminals; accumulation means provided in said network for accumulating information indicative of the occurrence of a transfer of an incoming call directed to said first destination terminal each time a transfer of call occurs from said first destination terminal to another destination terminal; transfer notification means provided in said network for notifying said first destination terminal of the occurrence of said transfer of call by transmitting a control signal indicative of the occurrence of said transfer, from said network to said first destination terminal; and transfer reporting means provided in said network for receiving a request signal from said first terminal, said transfer reporting means transmitting said call transfer information from said accumulation means to said first destination terminal in response to said request signal. According to the present invention, the user at the terminal at which the transfer of incoming call occurs is notified of the fact that the transfer has occurred based upon the call transfer information. The call transfer information may contain information about the calling party such as the terminal dial number of the calling terminal for each transfer of the call and the time when the transfer occurred. The call transfer information is displayed at the terminal for each transfer when there are a plurality of call transfer occurred, and the user can review the call transfer information for all the transfers that have occurred at the terminal by repeatedly requesting the call transfer information until it is notified that all the call transfer information are already transmitted to the terminal for display.

Other objects and further features of the present invention will become apparent from the following detailed description when read in conjunction with the attached drawings.

DETAILED DESCRIPTION OF THE PREFERRED EMBODIMENT

Figure 2:
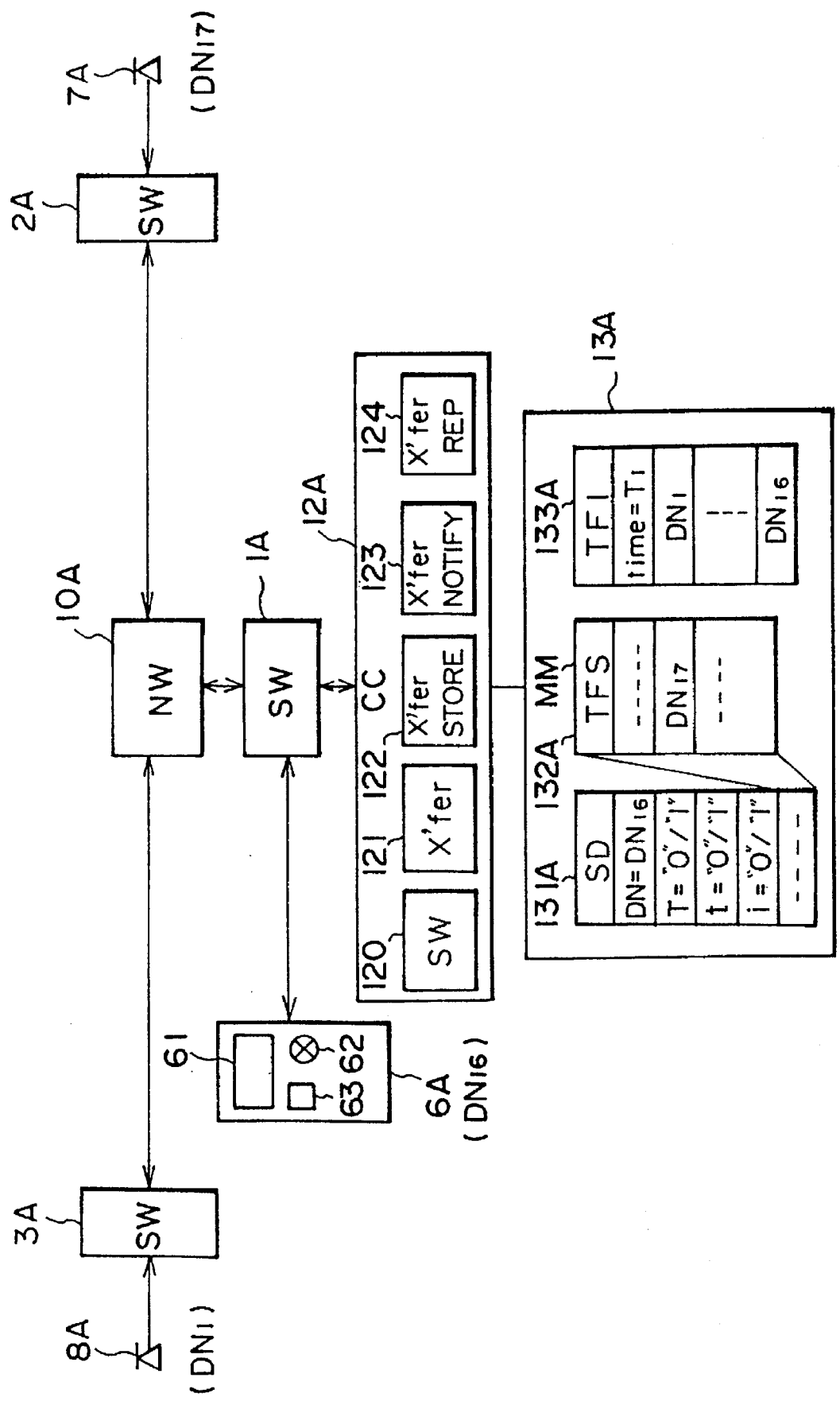
FIG. 2 is a diagram showing the construction of a telecommunication system according to a first embodiment of the present invention.

FIG. 2 shows the construction of the telecommunication system according to a first embodiment of the present invention.

Figure 1:
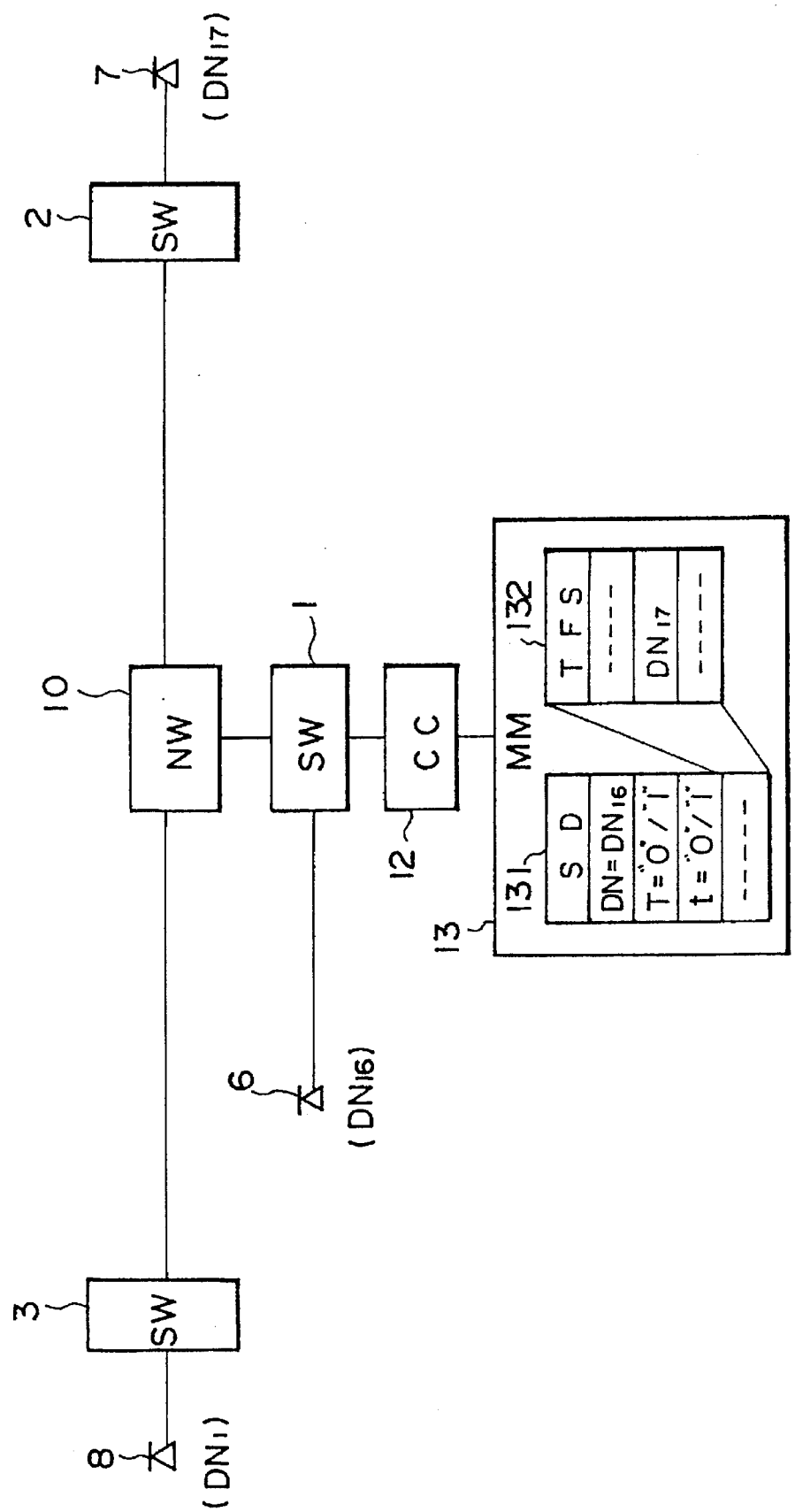
FIG. 1 is a diagram showing the construction of a conventional telecommunication system including a network that has the capability of transferring a call.

Referring to FIG. 2, the telecommunication system includes switching stations 1A, 2A and 3A as well as terminals 6A, 7A and 8A similarly to the system of FIG. 1, wherein the switching stations 1A, 2A and 3A form a network 10A corresponding to the network 10, and the terminals 6A, 7A and 8A are connected respectively to the switching stations 1A, 2A and 3A similarly to the system of FIG. 1. There, the terminal 6A has a display device 61 for displaying the call transfer information to be described later, in the form of characters. Further, there is provided an indicator lamp 62 that notifies the user of occurrence of a call transfer from the terminal 6A to another terminal. Furthermore, the terminal 6A is equipped with a switch or key 63 for activating a central control unit 12A to be described later for reading out the information about the call transfer that has occurred at the terminal 6A. The switch 63 may be the usual keypad used commonly in telephones for dialing. It should be noted that other terminals 7A and 8A have the construction substantially identical with the construction of the terminal 6A.

The central control unit 12A corresponds to the central control unit 12 of FIG. 1 and controls the usual switching operation of the switching station 1A as indicated by a functional block 120. Further, the central control unit 12A conducts a transfer of incoming call directed to the terminal that is connected to the switching station 1A such as the terminal 6A, from the terminal 6A to another terminal similarly to the system of FIG. 1. This function is schematically illustrated in FIG. 2 by a block 121. For this purpose, the system of FIG. 2 includes a main memory 13A that cooperates with the central control unit 12A similarly to the main memory 13 of FIG. 1, and the central control unit 12A controls the transfer of the call based upon the subscriber data stored in a memory field 131A and the dial number data stored in a memory field 132A, wherein both the memory field 131A and the memory field 132A are provided in the main memory 13A.

Thus, when a call directed to the terminal 6A comes in, for example, the central control unit 12A checks for the flags T and t for the terminal 6A (DN=$DN_{16}$) in the field 131A. When any one of these parameters is not "1," it indicates that the terminal 6A does not use the call transfer service and the call is forwarded to the terminal 6A according to the usual switching function of the switching station 1A as indicated by the block 120. On the other hand, when both parameters T and t are "1," it indicates that the terminal 6A uses the call transfer service and the switching station 1A refers to the memory field 132A for the dial number of the terminal to which the call is to be transferred. When the dial number such as $DN_{17}$ is set therein in correspondence to the terminal 7A, the switching station 1A transfers the call to the terminal 7A according to the transfer function represented in FIG. 2 by the block 121. The switching function and the call transfer function described so far correspond to the conventional switching and call transfer function of the conventional system of FIG. 1.

In the system of FIG. 2, the central control unit 12A further conducts the operation for storing the call transfer information in a part of the main memory 13A as indicated by a field 133A. There, the time $T_1$ indicative of the time at which the transfer has occurred and the dial number such as $DN_{17}$ of the terminal that has issued the call are stored in the field 133A as the call transfer information. Each time new call transfer information is stored in correspondence to the occurrence of call transfer, the previously stored call transfer information is shifted to a higher address. Alternatively, new transfer information may be stored while increasing the address each time. Of course, the call transfer information is stored in the memory field 133A for each terminal such as the terminal 6A that is connected to the switching station 1A. Further, in response to the storage of the call transfer information in the memory field 133A, a flag "1" indicative of the occurrence of call transfer is set in the parameter i that is provided in the memory field 131A as a part of the subscriber data SD of the terminal 6A. The foregoing process for storing the call transfer information and setting of the flag in the parameter i is schematically illustrated in FIG. 2 by a functional block 122.

Subsequently to the call transfer and setting of the parameter i, the central control unit 12A now transmits a control signal indicative of the occurrence of call transfer to the terminal 6A, and the control signal thus transmitted is used to activate the flashing of the indicator lamp 62 provided on the terminal 6A. This function for notifying the call transfer is represented in FIG. 2 by a functional block 123.

Further, in response to the actuation of the switch 63 at the terminal 6A by the user, the central control unit 124 transmits the call transfer information to the terminal 6A for displaying at the display 61, and the user at the terminal 6A can know the time when the call transfer has occurred and the dial number of the calling party that has sent the call. By repeatedly actuating the switch 63, the call transfer information stored in the memory field 133A are read out and transmitted one by one. When the last call transfer information is transmitted, the central control unit 12A sets the parameter i to "0" and deenergizes the indicator lamp 62. Thereby, the user at the terminal 6A can know, each time he or she actuates the switch 63, whether or not there is next call transfer information to be read, based upon the status of the indicator lamp 62.

Figure 3:
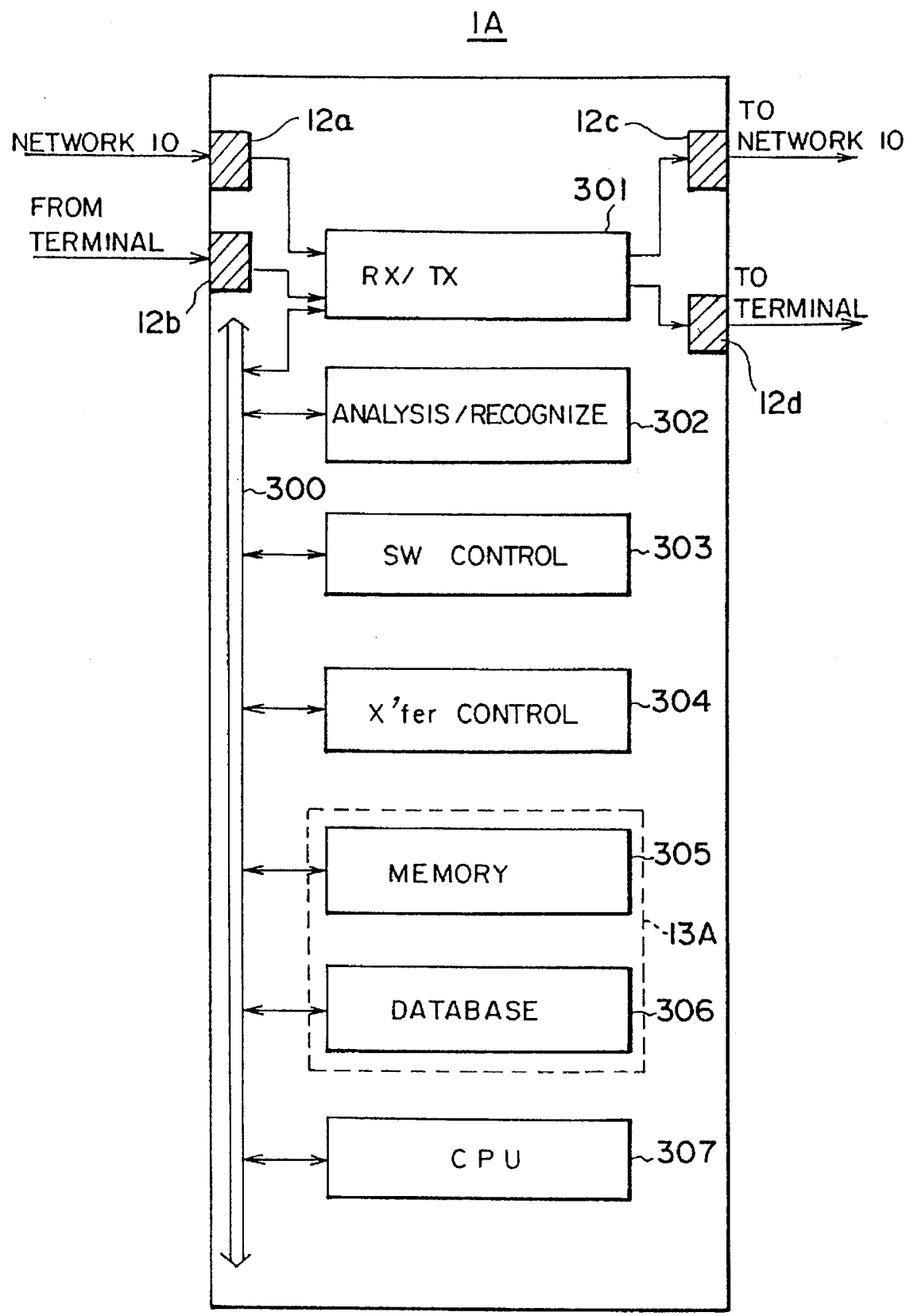
FIG. 3 is a block diagram showing the construction of the switching station used in the telecommunication system of FIG. 2.

FIG. 3 shows the schematical hardware construction of the switching station 1A including the central control unit 12A.

Referring to FIG. 3, the switching station 1A includes an input terminal 12a connected to an incoming trunk of the network 10, another input terminal 12b connected to the terminal 6A for receiving a call therefrom, an output terminal 12c connected to an outgoing trunk of the network 10, and an output terminal connected to the terminal 6A for sending a call thereto. There, the input and output terminals 12a–12d are connected to a transmission/reception unit 301 that in turn is connected to a system bus 300. Thus, when a call comes in at the terminal 12a or 12b, the unit 301 receives the call and transfers the same to the system bus 300. On the other hand, when a call is to be sent to the network 10 or to the terminal 6A, the unit 301 transfers the information or message on the bus 300 to the terminal 12c or 12d as a call information.

The call received at the unit 301 and transferred to the bus 300 is then analyzed in a call analysis/recognition unit 302 for the destination of the call, and the result of analysis is outputted on the system bus 300. Based upon the result of analysis thus outputted on the bus 300, a switching control unit 303, which is connected also to the bus 300, produces the call to be transmitted and outputs the same on the system bus 300. The call thus outputted on the system bus 300 in turn is transmitted to the destination terminal by the transmission/reception unit 301 either via the output terminal 12c or the output terminal 12d. Thereby, the ordinary switching of the call is achieved. In the illustrated system, the transmission/reception unit 301, the analysis/recognize unit 302 and the switching control unit 303 conduct the function of the block 120 shown in FIG. 2.

In the system of FIG. 3, there is provided another control unit, a transfer control unit 304, for performing the function of the blocks 121–124. There, the transfer control unit 304 is connected to the bus 300 and checks a database 306 connected to the bus 300 for the content of the subscriber data SD stored therein in correspondence to the memory field 131A of FIG. 2. When there is a flag "1" set in the parameters T and t as described previously, the transfer control unit 304 refers to the content of a memory 305 connected also to the bus 300 for the dial number of the terminal to which the call is to be redirected, and the switching operation conducted by the switching control unit 303 is interrupted. Thereby, the incoming call is transferred to the terminal according to the dial number thus read out from the memory 305. It should be noted that the memory 305 and the database 306 form a single memory device that acts as the main memory 13A. The separate representation of the memory 305 and the database 306 in FIG. 3 is merely for the sake of convenience of illustration. Further, in order to control the overall operation of the system 1A, there is provided a central processing unit 307 and the central processing unit 307 controls the operation of units 301–306 via the bus 300.

When a call is transferred, the transfer control unit 304 sets a flag "1" in the parameter i as already noted with reference to FIG. 2. At the same time, the unit 304 controls the memory 305 such that the memory 305 stores the time and the dial number of the terminal that has issued the call in the memory field 133A as the call transfer information. After the foregoing operation for transferring the call and storing the call transfer information, the transfer control unit 304 produces a control signal on the bus 300 and the same is transmitted to the called terminal such as the terminal 6A by the operation of the transmission/reception 301. Thereby, the transmitted control signal controls the terminal 6A to cause a flashing of the indicator lamp 62.

When the user at the terminal 6A actuates the switch 63 in response to the flashing of the indicator lamp 62, the transfer control unit 304 detects the actuation of the switch 63 based upon a request signal that is produced at the switch 63 and transmitted subsequently, via the transmission/reception unit 301, to the bus 300 of the switching station 1A after analysis at the analysis/recognition unit 302. In response to the request signal thus transmitted, the transfer control unit 304 read outs the call transfer information from the memory field 133A on the bus 300. Further, the transfer control unit 304 transmits the call transfer information thus read out on the bus 300, to the terminal 6A via the transmission/reception unit 301, and the terminal 6A displays the call transfer information thus transmitted on the display 61. Thereby the transfer control unit 304 performs the function of the block 124 of FIG. 2.

Figure 4:
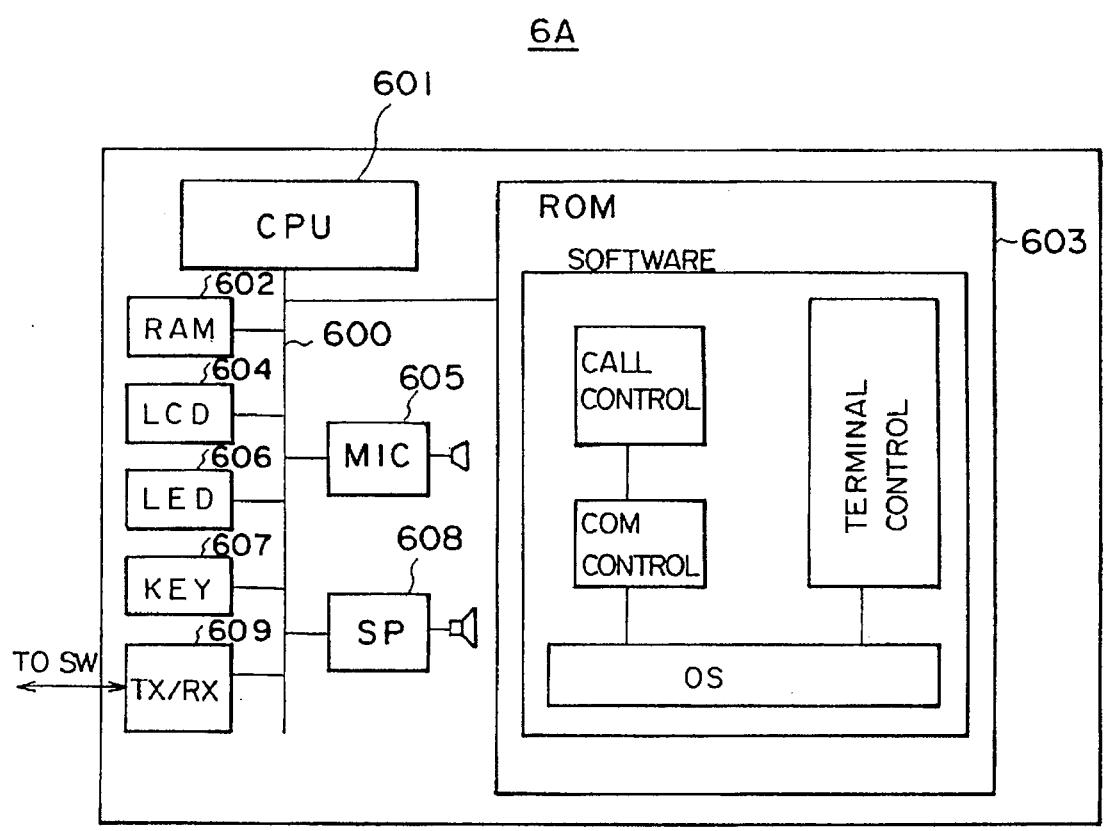
FIG. 4 is a block diagram showing the construction of the terminal that cooperates with the switching station of FIG. 3.

FIG. 4 shows the schematical hardware construction of the terminal 6A.

Referring to FIG. 4, the terminal 6A includes a bus 600 to which a central processing unit 601 and a a random access memory 602 are connected. Further, a read only memory 603 is connected to the bus for providing various control programs that are conducted by the central processing unit 601. The programs stored in the read only memory 603 include a control program for the usual call set up and a control program for the usual communication control as well as a control program for controlling various devices that are connected to the bus 600. These devices include a liquid crystal display device 604 for displaying the call transfer information in the form of characters, a speech input device 605 connected to a microphone for converting the speech of the user to an encoded electric signal, a light emitting diode 606 for signaling the existence of the call transfer information, a keypad 607 including the switch 63 for dialing and for sending various control signals, an audio output device 608 for outputting encoded electric signals on the bus 300 in the form of audio signals, and a transmission/reception device 609 connected physically to the switching station for communicating therewith. There, the central processing unit 601 detects the incoming of the control signal that is issued at the switching station 1A according to the communication control program and activates the light emitting diode 606 under the control of the terminal control program. Thereby, the indicator lamp 62 of FIG. 2 is activated. Further, the actuation of the keypad 607 according to a predetermined keystroke in correspondence to the actuation of the switch 63 is detected by the central processing unit 601 and the central processing unit 601 transmits a request signal to the switching station 1A for requesting the transmission of the call transfer information. Further, the central processing unit 601 detects the transmission of the call transfer information and activates the liquid crystal display device 604 to display the transmitted call transfer information thereon.

Next, the operation of the switching station 1A, particularly of the transfer control unit 304 of FIG. 3 will be described with reference to the flowchart of FIG. 5.

Figure 5:
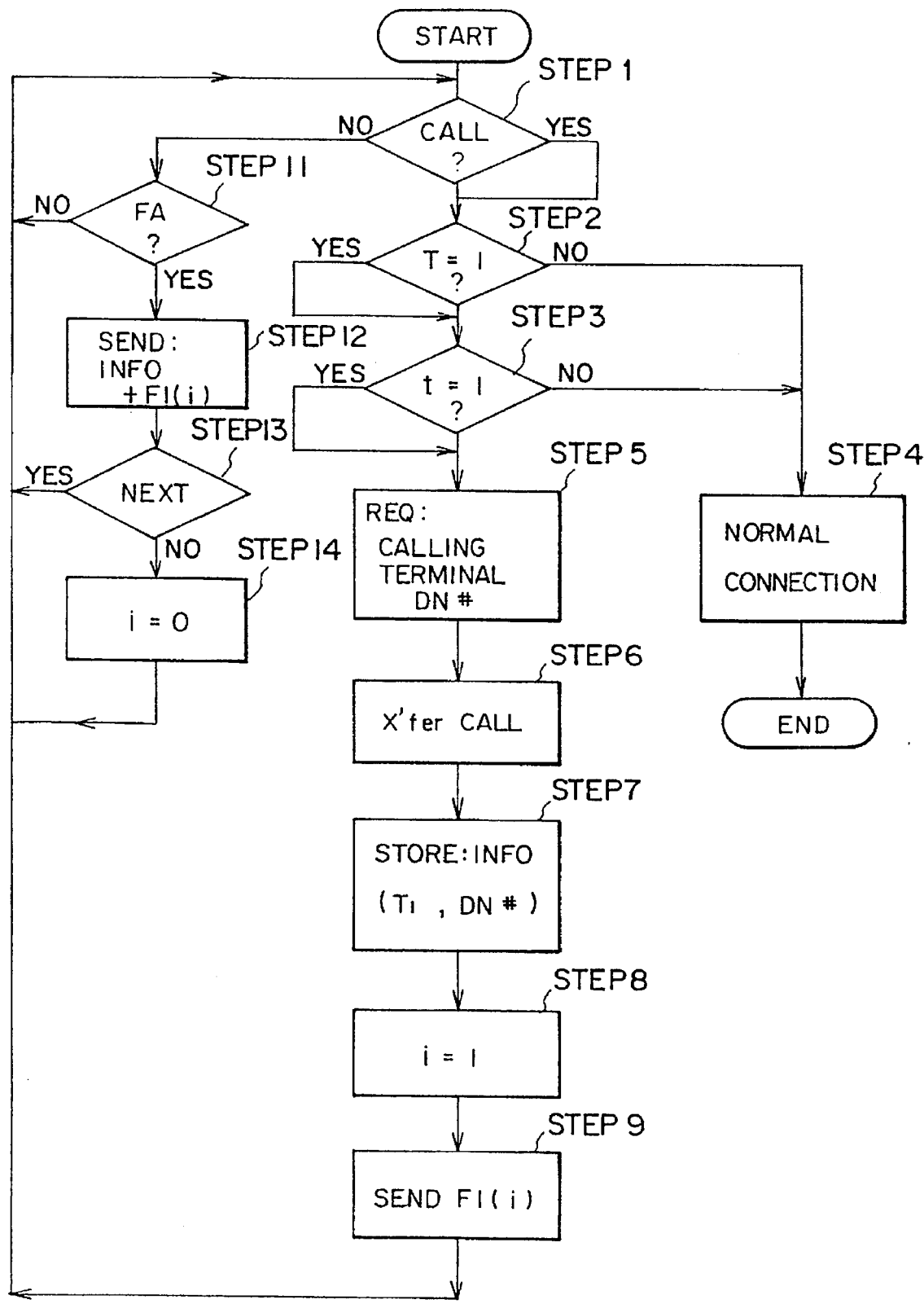
FIG. 5 is a flowchart showing the operation achieved in the central control unit provided in the network.

Referring to FIG. 5, the transfer control unit 304 watches out for the incoming call appearing on the bus 300 in a step 1, and discriminates the content of the parameters T and t in steps 2 and 3. When the parameters T and t are set to "0," the transfer control unit 304 hands over the control of the switching station 1A to the switching control unit 303 in a step 4, and the unit 303 carries out the normal switching procedure. After disconnection, the operation of the switching station 1A returns to the step 1.

On the other hand, when the parameters T and t are both set to "1," the transfer control unit 304 carries out a step 5 and requests the dial number of the calling terminal that has issued the call to the switching station 3A. Next, in a step 6, the transfer control unit 304 transfers the incoming call to the terminal of which dial number is set in the memory field 132A of the main memory 13A, and stores the time at which the transfer has been made as well as the dial number of the calling terminal in the memory field 133A in a step 7 as the call transfer information. Further, in a step 8, the control unit 304 sets the flag "1" for the parameter i in the memory field 131A. Further, the transfer control unit 304 transmits a control signal FI, set to a first, turn-on state in correspondence to the flag "1" set in the parameter i, to the terminal 6A via the transmission/reception unit 301 to set the indicator lamp 63 of the terminal 6A in the turned-on state or flashing state. After the step 9, the operation of the switching station 1A returns to the step 1 for responding to the next incoming call or to the request signal from the terminal 6A.

In the foregoing process of FIG. 5, it should be noted that a step 11 is conducted when the result of discrimination at the step 1 is NO in correspondence to the absence of incoming call. There, the transfer control unit 304 watches out for a request signal FA produced at the terminal such as the terminal 6A by the actuation of the switch 63 by the user. When the result is NO, the monitoring process at the step 1 is resumed for responding the incoming call. On the other hand, when such a request signal FA is supplied from the terminal 6A, the unit 304 reads out the call transfer information and sends the same to the terminal 6A. In response to the information thus transmitted, the terminal 6A displays the call transfer information on the display device 61.

It should be noted that the control signal FI having the first state for energizing the indicator lamp 63 is sent together with the call transfer information to the terminal in the step 12. Thus, the lamp 63 continues flashing when the call transfer information is transmitted to the terminal 6A.

After the step 12, a discrimination is made in a step 13 whether there is next call transfer information in the memory field 133A and if YES, the process starting at the step 1 is repeated. Thus, in response to the actuation of the switch 63 at the terminal 6A that in turn is made by the user in response to the continuous flashing of the indicator lamp 63, the call transfer information for the next call that has been transferred is sent to the terminal 6A. When it is discriminated in the step 14 that there is no next call transfer information, the parameter i is reset to "0" in a step 14. Thus, when the user actuates the switch 63 again, only the control signal FI having a second, turn-off state is transmitted in the step 12 in correspondence to the value 0 of the parameter i. In correspondence to this, the flashing of the indicator lamp 63 is deactivated. By repeating the process as above, the user at the terminal can read all the call transfer information starting from the newest and proceeding to the oldest.

Figure 6:
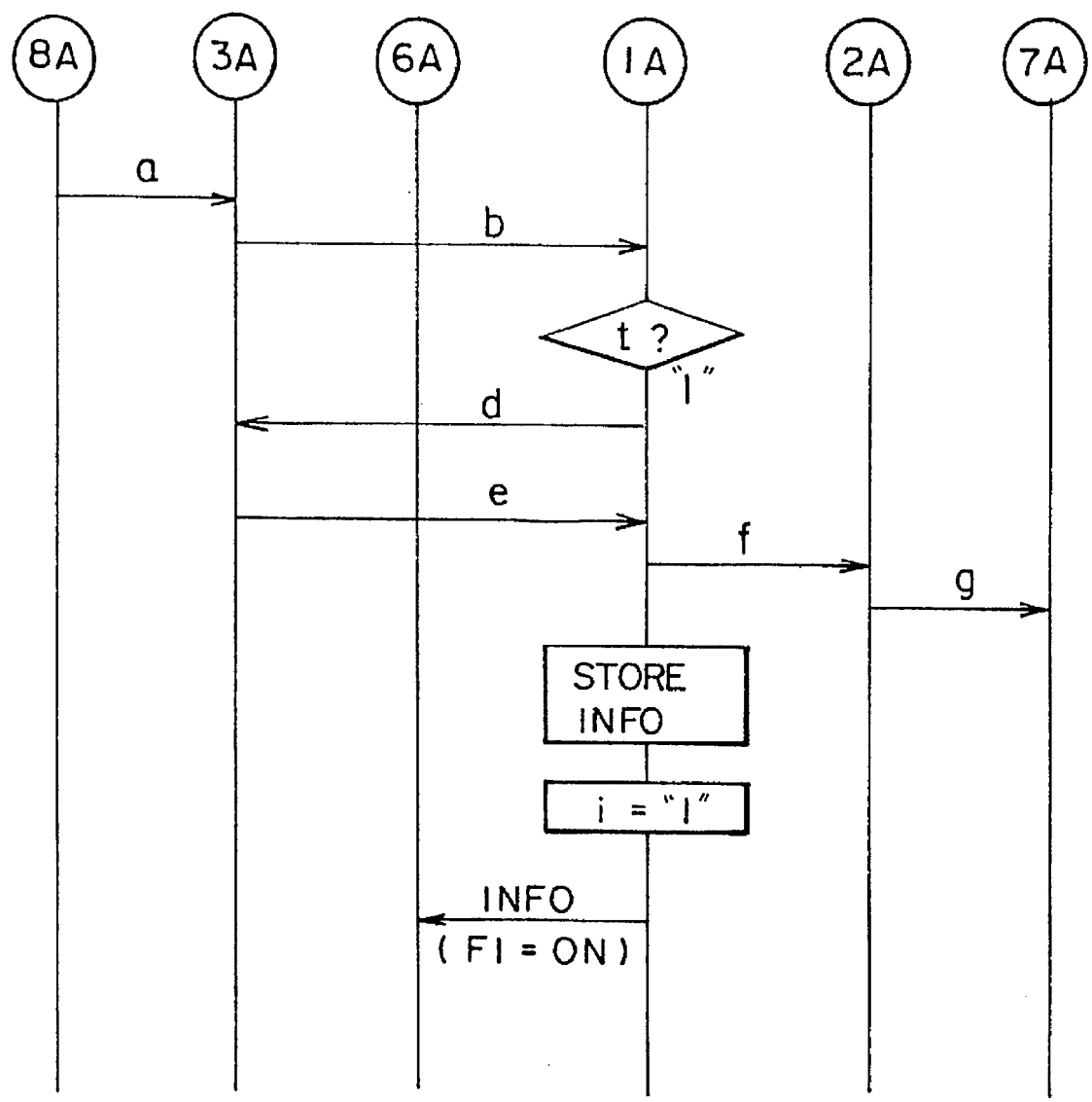
FIG. 6 is a timing chart showing the accumulation and transmission of call transfer information occurring in the system of FIG. 2.
Figure 7:
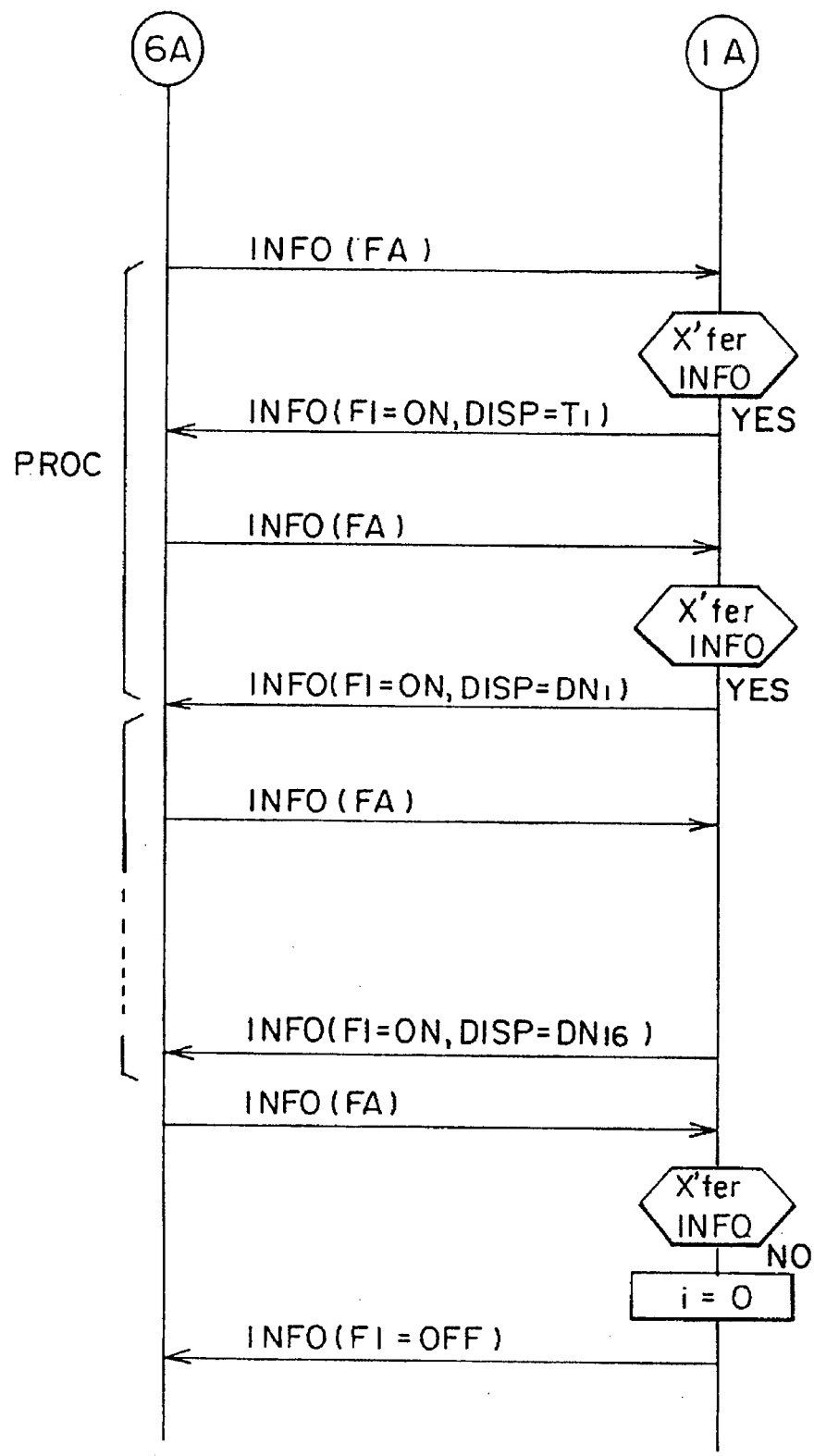
FIG. 7 is a timing chart showing a control process for displaying the call transfer information at the terminal at which the transfer has occurred.

FIGS. 6 and 7 show the time sequential representation of the process described above, wherein FIG. 6 represents the processes from the step 1 to the step 9 and FIG. 7 represents the processes from the step 11 to the step 14.

Referring to FIG. 6, a call request is issued at the terminal 8A to the switching station 3A to which the terminal 8A is connected as indicated by a symbol "a," for requesting a call to be sent from the terminal 8A to the destination terminal 6A. In response to the call request, the switching station 3A sends the call to the switching station 1A to which the destination terminal 6A is connected as indicated by a symbol "b." In the switching station 1A, the contents of the flags T and t are examined, and when the flags T and t are both set to "1," the switching station 1A sends a request to the switching station as indicated by a symbol "d" for requesting the dial number of the calling terminal 8A. Further, the switching station 3A sends back the requested dial number of the calling terminal as indicated by a symbol "e."

Next, the call is transferred from the switching station 1A to the switching station 2A and further to the terminal 7A that is connected to the switching station 2A, based upon the dial number stored in the memory field 132A. Further, the switching station 1A stores the call transfer information in the memory field 133A according to the process described with reference to the flowchart of FIG. 5 and sets the flag "1" in the parameter i in correspondence to the storage of the call transfer information in the memory field 133A. Further, in response to the value of the parameter i thus set to "1," the switching station 1A sends the foregoing control signal FI to the terminal 6A with the first state (FI=ON) and activates the flashing of the indicator lamp 63.

In the process of FIG. 7 for sending the call transfer information from the switching station 1A to the terminal 6A, the terminal 6A sends the request signal FA to the switching station 1A in response to the actuation of the switch 53 as already described, and the switching station 1A returns the information indicative of the time $T_1$ together with the control signal FI set to the first state (FI=ON) to the terminal 6A. In response to the signal FI thus transmitted, the indicator lamp 62 at the terminal 6A keeps on flashing and urges the user of the terminal to actuate the switch 63 again for reading the dial number $DN_1$ of the terminal that has issued the transferred call. Thus, in response to the control signal FA issued again by the user, the switching station 1A transmits the dial number $DN_1$, together with the control signal FI to keep the indicator lamp 62 flashing. The time $T_1$ and the dial number $DN_1$ may be erased from the memory field 133A upon transmission to the terminal 6A.

As long as call transfer information remains in the memory field 133A, the indicator lamp 62 keeps on flashing in correspondence to the control signal FI that is returned from the switching station 1A, and the processes described above and represented in FIG. 7 as PROC, are repeated. On the other hand, when there is no call transfer information remaining in the memory field 133A in response to the transmission of the last call transfer information such as $DN_{16}$, the parameter i is set to the value "0" and the control signal FI now set for deenergizing the indicator lamp 62 (FI=OFF) is transmitted in response to the request signal FA. In response to the transmission of the control signal FI, the flashing of the lamp 62 stops.

Figure 8:
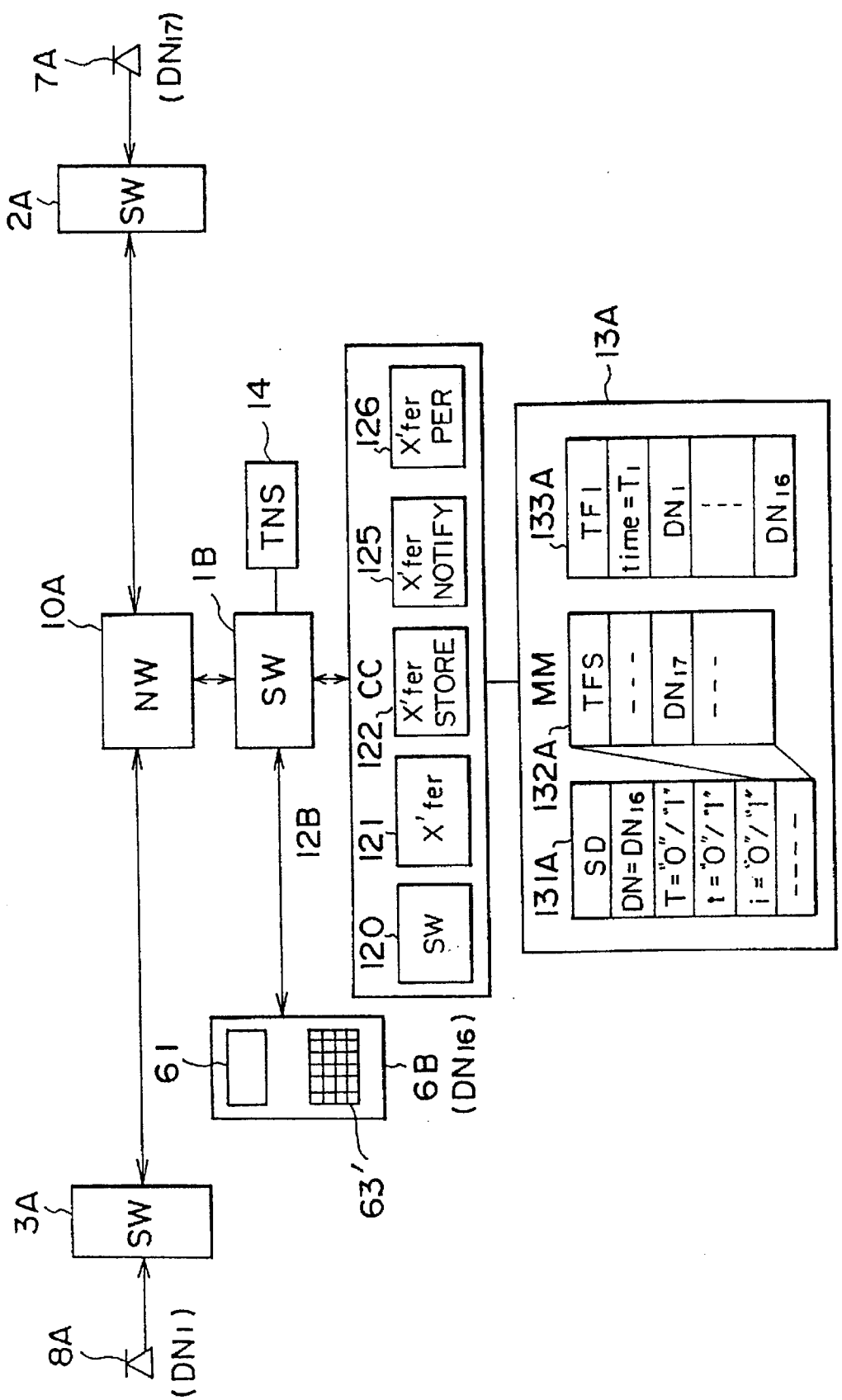
FIG. 8 is a diagram showing the construction of a telecommunication system according to a second embodiment of the present invention.

FIG. 8 shows the construction of the telecommunication system according to a second embodiment of the present invention.

Referring to FIG. 8, the system of FIG. 8 has a construction substantially identical with the system of FIG. 2 except that the present embodiment employs a signal tone generator 14 designated as TNS in FIG. 8 in a switching station 1B that corresponds to the switching station 1A of FIG. 2, wherein the signal tone generator TNS is the device that has been used conventionally in the switching stations for producing dial tone and busy tone. Further, the functions similar to the functions that are conducted at the switching station 1A are designated by the same reference numerals.

In the present embodiment, the signal tone generator TNS is used not only for producing the dial tone and the busy tone but is used also for notifying the user at the terminal such as the terminal 6A of the existence of call transfer information. In other words, the system of FIG. 8 notifies the user of the terminal 6B of the occurrence of call transfer at the terminal 6B by producing a modified dial tone that is different from the usual dial tone. Based upon the modified dial tone, the user sends a request signal to the switching station 1A by inputting a predetermined keystroke via a keypad 63'. In response to the request signal, the call transfer information are read out from the memory field 133A and transmitted one by one to the terminal 6A. At the terminal 6A, the transmitted call transfer information is displayed at the display 61. In correspondence to the foregoing modification, the switching station 1B uses a central control unit 12B that is slightly different from the central control unit 12A. More specifically, the function for notifying the user of the existence of the call transfer information is now represented by a block 125, and the function for controlling the transmission of the call transfer information is represented by a block 126. As a result of the foregoing modification, the subscriber can use a terminal 6B that has a conventional construction for the terminal of the network. In other words, the terminal 6B is no longer required to have special equipments such as the indicator lamp 62 or control switch 63. Only the display 61 is used.

Figure 9:
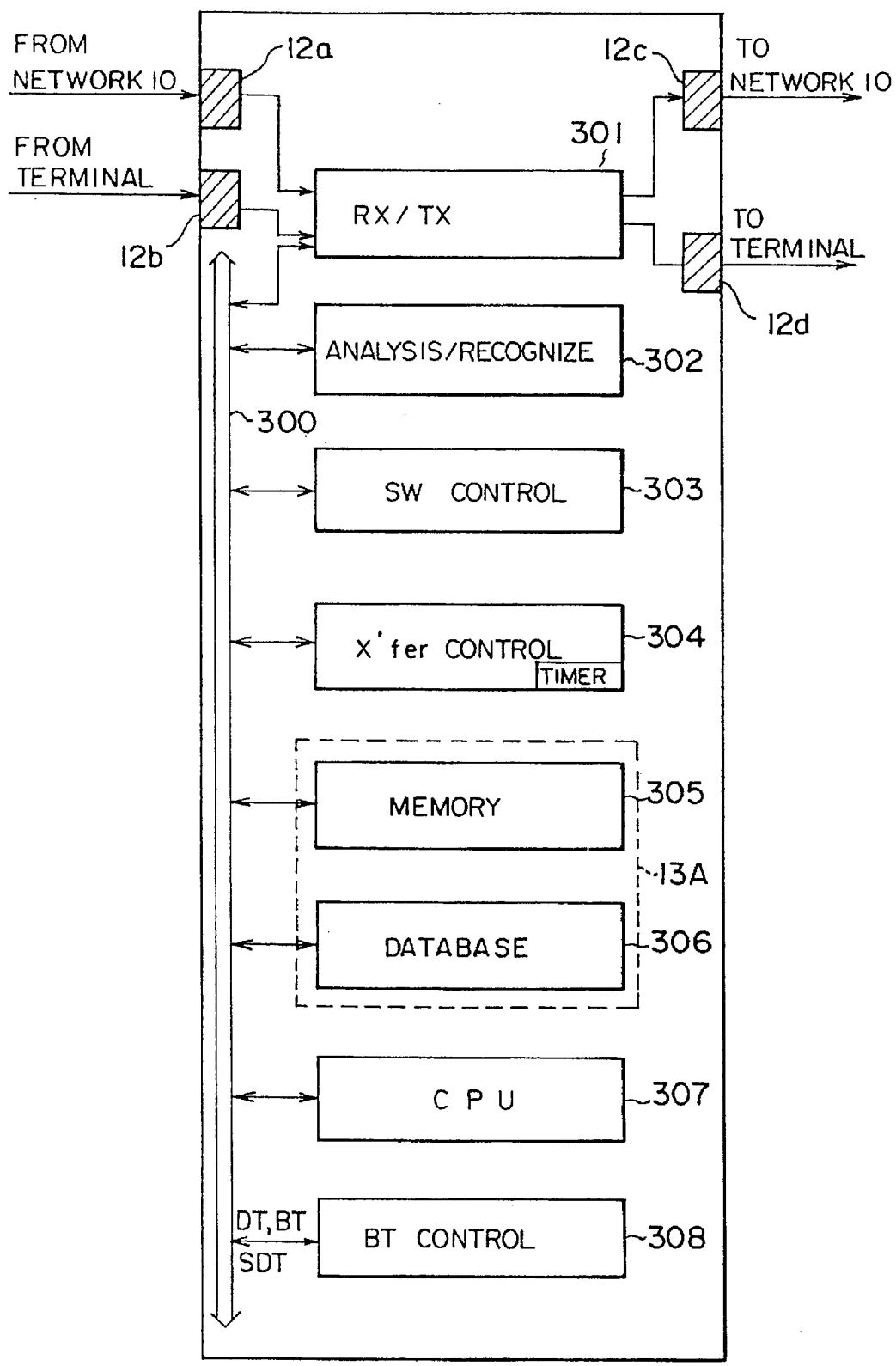
FIG. 9 is a diagram showing the hardware construction of the switching station that is used in the telecommunication system of FIG. 8.

FIG. 9 shows the hardware construction of the switching station 1B that includes the central control unit 12B. In FIG. 9, the parts that functions identically with the parts explained already with reference to FIG. 3 are designated by the same reference numerals and the description thereof will be omitted.

In the switching station 1B, there is provided a busy tone control unit 308 in addition to the units 301–307 in connection to the bus 300, wherein the busy tone control unit 308 is the device that has been used conventionally for producing the dial tone DT and the busy tone BT under the control of the switching control unit 303. In addition, the busy tone control unit 308 of the present embodiment produces, under the control of the transfer control unit 304, the modified dial tone SDT when the memory field 133A stores the call transfer information and the parameter i is set to "1" in correspondence thereto. There, the transfer control unit 304 passes the modified dial tone SDT to the switching control unit 303 as the dial done DT, and the switching control unit 303 transmits the modified dial tone SDT to the terminal 6B when the user at the terminal 6A causes an offhook for sending a call. Thereby, the user hears the modified dial tone SDT and is informed of the fact that there has been a transfer of call at the terminal 6B.

In response to the modified dial tone SDT, the user inputs the predetermined keystroke at the keypad 63', and a request signal is transmitted to the transfer control unit 304 via the transmission/reception unit 301. There, the transfer control unit 304 reads out the call transfer information and transmits the same to the terminal 6A for display at the display device 61. When there are a number of calls, the transfer control unit 304 reads out the call transfer information at the smallest address and transmits the same consecutively with a predetermined time interval that is measured by a clock cooperating with the unit 304, while shifting the address in the downward direction. The operation of the transfer control unit 304 for storing the call transfer information is identical with the process of the first embodiment. Thus, the description thereof will be omitted.

Figure 10:
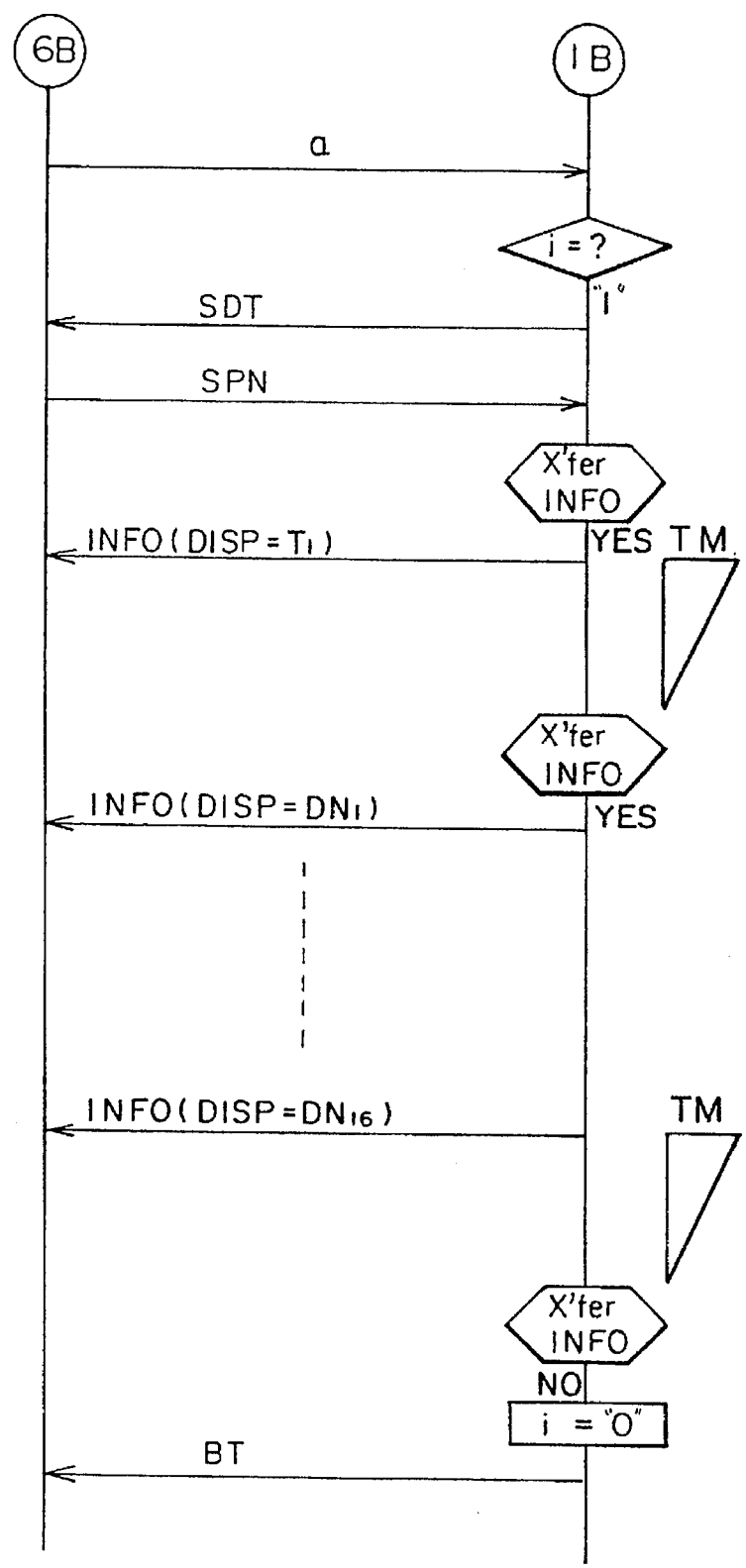
FIG. 10 is a diagram showing a control process for displaying the call transfer information at the terminal at which the transfer has occurred in the telecommunication system of FIG. 8.

FIG. 10 shows the foregoing operation for transmitting the call transfer information from the switching station 1B to the terminal 6B.

Referring to FIG. 10, a call request a is issued at the terminal 6B in response to an offhook procedure occurred therein. When the parameter i is set with the flag "1" as already noted, the switching control unit 303 returns the modified dial tone SDT to the terminal 6B. When the parameter i is set to zero, on the other hand, the usual dial tone DT is returned as usual.

In response to the modified dial tone SDT, the user at the terminal issues a request signal SPN by providing a predetermined keystroke as described previously, and the request signal SPN is transferred to the transfer control unit 304 via the transmission/reception unit 301 and the bus 300 after analysis at the analysis/recognition unit 302. In response to the request signal SPN, the transfer control unit 304 reads out the first part of the call transfer information such as the time data $T_1$ indicative of the time at which the transfer has occurred and transmits the same to the terminal 6B. Simultaneously, the transfer control unit 304 starts a timer by counting the clock pulse used in the switching system 1B as indicated by TM. When the timer times out after a predetermined time interval, the transfer control unit 304 transmits the dial number $DN_1$ in the call transfer information as the second part of the call transfer information. Simultaneously to the transmission, the control unit 304 erases the time data $T_1$ and the dial number $DN_1$ at the first address of the memory field 133A. After a predetermined time set as previously, the transmission of the next call transfer information is conducted by sending the time of the next call transfer followed by the next dial number. As long as there is the call transfer information remaining in the memory field 133A, the foregoing process of transmitting the time data and the dial number is repeated consecutively with the foregoing predetermined time interval. When there is no call transfer information anymore in the memory field 133A, the transfer control unit 304 sets the flag "0" in the parameter i and controls the busy tone control unit 308 to produce the busy tone BT. Thereby, the busy tone BT is transmitted to the terminal 6B and informs the user that there is no remaining call transfer information.

According to the present embodiment, one can notify the call transfer information to the terminal even when the user at the terminal uses a telephone set of conventional construction that lacks the indicator lamp and special control switch. Only the display device is required. It should be noted that such a telephone set equipped with display device is commonly available in the market. Further, it should be noted that the foregoing construction of the switching station is not limited to the switching station 1A or 1B but is applicable also to other switching stations.

Further, the present invention is not limited to the embodiments described heretofore, but various variations and modifications may be made without departing from the scope of the present invention.

What is claimed is:

1. An exchange comprising:

call forwarding means provided in said exchange for forwarding a call directed to a called terminal, from a calling terminal to a forwarding terminal and for connecting the call between the calling terminal and the forwarding terminal;

accumulation means provided in said exchange for accumulating call forwarding information indicating a presence of the call directed to the called terminal and a time of the call forwarding; and notification means provided in said exchange for notifying said called terminal of accumulation of said call forwarding information by transmitting thereto a control signal.

2. The exchange as claimed in claim 1, which further comprises:

reporting means for receiving a request signal from said called terminal and for transmitting said call forwarding information from said accumulation means to said called terminal in response to said request signal.

3. The exchange as claimed in claim 2, wherein said accumulation means stores the time when said call forwarding has occurred and information for identifying the terminal that has issued the call which has been forwarded as a result of said call forwarding.

4. The exchange as claimed in claim 2, wherein said control signal transmitted by said notification means controls said called terminal to cause a visual signaling to a user of said called terminal.

5. The exchange as claimed in claim 4, wherein said called terminal is provided with an indicator lamp, and said control signal activates said indicator lamp.

6. The exchange as claimed in claim 2, wherein said notification means transmits said control signal as a dial tone which is distinguishable from a dial tone which is returned to said called terminal in response to a call request from said called terminal when there is no call forwarding information stored in said accumulation means.

7. The exchange as claimed in claim 2, wherein said reporting means checks for the existence of the call forwarding information to be transmitted in said accumulation means each time said request signal is issued from said called terminal and transmits said control signal to said called terminal for notifying said called terminal of the non-existence of call forwarding information to be transmitted when there is no call forwarding information in said accumulation means to be transmitted.

8. The exchange as claimed in claim 1, wherein said call forwarding information is transmitted to said called terminal within a predetermined time interval.

9. The exchange as claimed in claim 2, wherein said called terminal is provided with a display device for displaying said call forwarding information transmitted by said reporting means.

10. The exchange as claimed in claim 1 in combination with a plurality of telecommunication terminals including said calling terminal and said called terminal wherein each terminal comprises:

call-forwarding indication means, receiving from said exchange call-forwarding information indicating that forwarding of a call incoming to said called terminal has occurred, said call-forwarding indication means displaying said call forwarding information;

query means for issuing a query to said exchange about details of said call forwarding information displayed by said call-forwarding indication means; and detail indication means activated in response to said query from said query means for receiving detailed contents of said call forwarding information, said detail indication means displaying said detailed contents.

11. The combination as claimed in claim 10, wherein said call-forwarding indication means comprises a display panel.

12. The combination as claimed in claim 10, wherein said call-forwarding indication means comprises a lamp.

13. The exchange as claimed in claim 1, in connection with a plurality of telecommunication terminals including said calling terminal and said called terminal wherein each said terminal comprises:

first display means for receiving a notification from said exchange that a call destined to said called terminal has occurred, said first display means indicating that a call forwarding has occurred;

request means for requesting history information to said exchange, said history information indicating occurrences of call-forwarding to said called terminal in the past; and second display means for receiving said history information from said exchange, said second display means displaying said history information.

14. An exchange comprising:

call forwarding means provided in said exchange for forwarding a call directed to a called terminal, from the calling terminal to a forwarding terminal and for connecting the call between the calling terminal and the forwarding terminal;

accumulation means provided in said exchange for accumulating call forwarding information indicating a presence of the call directed to the called terminal and a time of the call forwarding; and notification means provided in said exchange for notifying said called terminal of accumulation of said call forwarding information by transmitting thereto a control signal;

reporting means for receiving a request signal from said called terminal and for transmitting said call forwarding information from said accumulation means to said called terminal in response to said request signal, wherein said reporting means checks for the existence of the call forwarding information to be transmitted in said accumulation means each time said request signal is issued from said called terminal, and transmits said control signal to said called terminal for notifying said called terminal of the non-existence of call forwarding information to be transmitted when there is no call forwarding information in said accumulation means to be transmitted, and wherein said control signal transmitted to said called terminal for notifying of the non-existence of call forwarding information comprises a busy tone signal transmitted to terminals connected thereto for notifying a busy status of the exchange.

* * * * *